Jan. 26, 1943.   W. M. VENNER ET AL   2,309,555
PISTON
Filed March 30, 1942

INVENTORS,
William M. Venner and Percy L. Bowser, Jr.
BY Bruninga & Sutherland
ATTORNEYS.

Patented Jan. 26, 1943

2,309,555

UNITED STATES PATENT OFFICE 2,309,555

PISTON

William M. Venner, Clayton, and Percy L. Bowser, Jr., University City, Mo., assignors to The Sterling Corporation, St. Louis, Mo., a corporation of Delaware Application March 30, 1942, Serial No. 436,736

9 Claims. (Cl. 309—11)

This invention pertains to pistons for internal combustion engines.

In certain types of engines, notably aircraft engines, pistons are operated at high temperatures. The engine is often designed with a short stroke, so that the piston must be correspondingly short in the direction of its cylinder axis. In adapting aluminum pistons for use in this type of engine, considerable difficulty has been experienced in controlling the fit of the piston in the cylinder at different temperatures. As many of these engines are air-cooled and the operation of an airplane is such as to involve rapid changes in atmospheric temperature, the engine may at times be subjected to sudden changes in temperature over a considerable range. Accordingly, the piston in such an engine must be designed so that it will have a good fit in the cylinder at all temperatures within the operating range.

Where a piston is of large diameter and of short length compared to its diameter, the problem of controlling the expansion of the piston is sometimes difficult. The heat delivered to the head of the piston by the explosion of the gas must be dissipated through the body of the piston and to the cylinder walls. With a large diameter, a great amount of heat is delivered to the piston. At the same time, if the axial length is short, a comparatively limited area is available for transferring this heat to the cylinder wall.

In some prior piston structures, particularly those intended for automobile engines, a piston structure has been used in which the bearing portions of the skirt are separated from the head so as to permit those separated portions to flex in responding to the expansion of the piston and the pressure of the cylinder wall thereon. In such a piston a considerable portion of the heat delivered to the piston is transferred to the cylinder wall through the packing rings. The remainder flows through the body of the piston to the bearing faces thereof and is transferred to the cylinder walls through those bearing faces.

If such a piston structure were employed in the airplane type of engine, that is, with the increased diameter and shortened skirt, the amount of heat which must be transferred through the packing rings becomes excessive and it is difficult to keep the temperature of the piston head from rising to a dangerous value. This is particularly true when the engine is operating under a load and at its highest temperature. On account of the rapidity with which the heat must be transferred through the piston to the cylinder walls, the contact area of the packing rings becomes inadequate and the contact of the bearing faces of the skirt is not used at its best efficiency, because the heat is obstructed in its flow to those bearing faces by the horizontal slot which is just below the head.

One of the objects of this invention, therefore, is to provide an improved piston structure which will overcome the above-mentioned difficulties and maintain the piston at a safe temperature.

Another object is to provide such a structure with improved distribution of heat-transferring surfaces such as to shorten the average path of heat flow therethrough and render them capable of transferring an increased amount of heat to the cylinder walls.

Further objects will appear from the following description taken in connection with the accompanying drawing in which.

Figure 1:
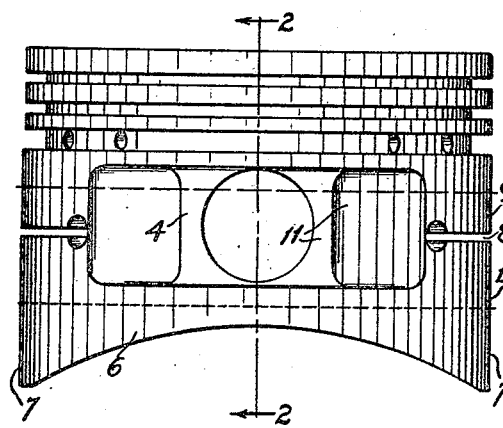
Figure 1 is a side view of a piston embodying this invention as seen along the wrist pin axis.
Figure 2:
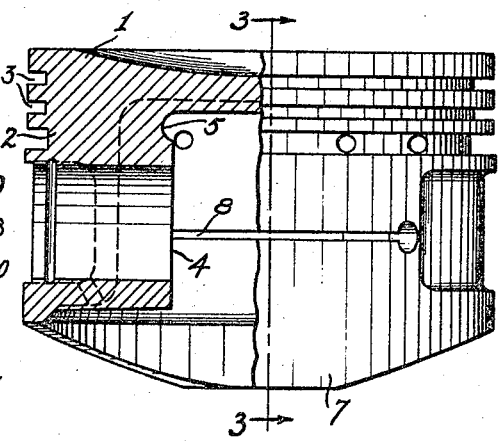
Figure 2 is a view partly in elevation and partly in section, the section being taken through the wrist pin axis.
Figure 3:
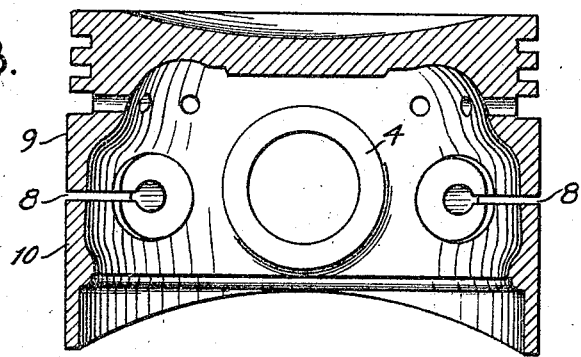
Figure 3 is a longitudinal section taken at right angles to the wrist pin axis.

Referring now to the drawing, the same represents a piston which is usually constructed of aluminum or an alloy thereof, or of any light metal suitable for this purpose. The piston comprises a head 1 having a downwardly extending ring flange 2 provided with packing ring grooves 3 in the usual manner. Wrist pin bosses 4 are connected to the head by short piers 5. Below the ring flange 2 a skirt 6 extends downwardly and is finished to provide cylinder bearing faces 7.

In accordance with this invention a transverse slot 8 is cut through one or both of the bearing portions 7. This slot is not, however, placed just under the ring flange 2, but is spaced downwardly therefrom and from the upper end of the skirt so as to divide the bearing face into two sections, namely, an upper section 9 and a lower section 10. The slots 8 extend through about 90° of the circumference of the skirt. The skirt area around the bosses 4 is relieved by suitable depressions indicated at 11. However, the lower rim of the skirt may be continuous below the wrist pin boss, as shown in Figure 1.

The slot 8 by separating the sections 9 and 10 from each other renders the sections relatively flexible independently of each other. At the same time the spacing of this slot downwardly from the upper end of the skirt provides a path for heat flow directly from the head to the upper section 9 without the necessity of passing around the end of the slot. The lower section 10, however, will operate at a lower temperature because the heat must flow to it around the ends of the slot 8.

Figure 4:
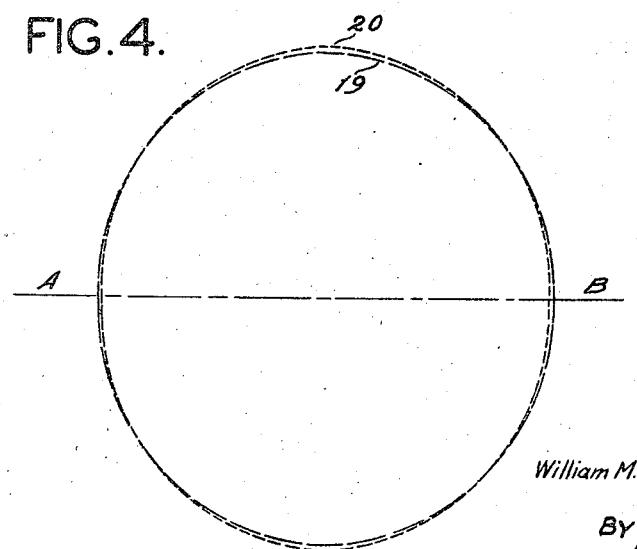
Figure 4 is a diagram illustrating the structure and action of the piston.

In addition to dividing the bearing face into separate sections by placing the slot 8 in the position described, the skirt is formed by what is termed cam-grinding, so as to, generally stated, give the upper and lower sections slightly different shapes in cross-section. The sections 9 and 10 are ground to give them different clearances with respect to the cylinder wall, the upper section having the greater clearance in the direction transverse to the wrist-pin axis. By thus giving the lower section a slightly greater eccentricity than the upper section, the lower section 10 may contact the cylinder wall at the ends of its thrust axis at lower operating temperatures while the upper section 9 will approach contact with the cylinder wall only at higher temperatures. In accordance with an embodiment of this invention, the skirt is cam-ground so as to render it slightly elliptical in cross-section, the major axis of the ellipse being transverse to the wrist-pin axis. However, in accordance with this invention the cam-grinding given to the skirt is different for the portions 9 and 10. Both are elliptical but they have different eccentricities. Their relation is indicated diagrammatically in Figure 4, in which the line A—B represents the wrist-pin axis, the dashed line 19 represents the form of the upper section 9, and the dotted line 20 represents the form of the lower section 10.

It will be seen that the section 10 is formed to a slightly greater eccentricity than the section 9. Also, the upper section 9 has a somewhat greater clearance with respect to the cylinder at its bearing face than does the lower section 10. The contours of the two sections merge where the lines 19 and 20 cross each other, which is about where the slots 8 terminate. The clearance may be of the order of from .008 to .010 inch. On the other hand, the lower section 10 may be given clearances of the order of from .002 to .003, these figures being for a piston diameter of approximately 4 in.

In the operation of this piston the clearance given to the lower section 10 of the skirt is such that this part of the skirt will contact the cylinder wall at ordinary atmospheric temperature, being separated therefrom merely by the film of lubricant. As the piston temperature rises in operation, the expansion of the piston head causes the pin bosses 4 to move outwardly along the minor axis of the ellipse of Figure 4. This causes a tendency for the ends of the major axis of that ellipse to be drawn inwardly to a smaller diameter. However, this tendency to move inward is counteracted by the thermal expansion of the skirt at this point and tends to neutralize the same. Accordingly, this portion of the skirt maintains a nearly uniform fit with the cylinder wall at all temperatures.

The upper section 9 is clear of the cylinder wall at lower temperatures. However, when the engine operates under load and assumes its operating temperature, the upper portion 9 expands sufficiently so as to bring this part into bearing contact with the cylinder wall. When this takes place the contact area of the section 9 is added to that of the packing rings for transferring heat to the cylinder wall, and therefore provides additional facilities for dissipating the greater amount of heat generated during operation under load. Of course, that portion of the head 1 in which the grooves 3 are formed is ordinarily given still greater clearance than section 9 so that it does not contact the cylinder wall even at high temperatures.

It has been found that this piston structure is effective in maintaining a good fit of the piston at all operating temperatures and also in preventing overheating of the piston, while, at the same time, a substantial and rugged piston construction is provided.

It is obvious that various changes may be made in the details of construction within the scope of the appended claims without departing from the spirit of this invention, and that, accordingly, the invention is not limited to the specific details shown and described.

The invention having thus been described, what is claimed is:

1. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions being formed with a transverse slot dividing said portion into upper and lower sections, said upper section having an oval contour with its major axis transverse to the wrist-pin axis, and said lower section having a similar oval contour but with a greater major axis than said upper section, said contours merging adjacent the ends of said slot.

2. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions being formed with a transverse slot dividing said portion into upper and lower sections, said lower section having an oval contour with its major axis transverse to the wrist-pin axis, and said upper section having greater clearance with respect to the cylinder wall in the direction of said major axis than said lower section.

3. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions having means dividing said portion into upper and lower sections free for relative movement under thermal expansion, said sections being circumferentially continuous with the rest of said skirt and having substantially elliptical cross-sections with their major axes transverse to the wrist-pin axis.

4. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions having means dividing said portion into upper and lower sections free for relative movement under thermal expansion, said sections being circumferentially continuous with the rest of said skirt and having substantially elliptical cross-sections with their major axes transverse to the wrist-pin axis but having different eccentricities.

5. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, each of said cylinder-bearing portions being formed with a transverse slot dividing said portion into upper and lower sections, said upper section having an oval contour with its major axis transverse to the wrist-pin axis, and said lower section having a similar oval contour but with a greater major axis than said upper section, said contours merging adjacent the ends of said slot.

6. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions being formed with a transverse slot spaced downwardly from its upper end, the portion thereof above said slot having greater clearance with respect to the cylinder than the portion below said slot.

7. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, one of said cylinder-bearing portions being formed with a transverse slot spaced downwardly from its upper end, the portion thereof above said slot being dimensioned to contact the cylinder wall only at high temperature, and the portion below said slot being dimensioned to contact the cylinder wall at low temperatures.

8. A light-metal trunk piston for internal combustion engines, having a head provided with a flange adapted to receive packing-ring grooves, a skirt depending from said head, and wrist-pin bearings connected with said head, said skirt being axially short in comparison with its diameter and having cylinder-bearing portions connected with said head, each of said cylinder-bearing portions being formed with a transverse slot spaced downwardly from its upper end, the portion thereof above said slot having greater clearance with respect to the cylinder than the portion below said slot.

9. A trunk piston for internal combustion engines, having a head provided with a flange adapted to receive packing-ring grooves, wrist-pin bearings connected with said head, and a skirt depending from said head and connected with said bearings, said skirt being axially short in comparison with its diameter and having cylinder-bearing portions connected with said head, one of said cylinder-bearing portions being formed with a transverse slot dividing said portion into upper and lower sections and providing a barrier to flow of heat from said head to said lower section, said sections having oval contours with their major axes transverse to wrist-pin axis but said upper section having a greater clearance with respect to the cylinder wall so as to approach contact with said wall at higher operating temperatures whereby to provide increasing heat conduction to said wall at such higher temperatures.

WILLIAM M. VENNER.
PERCY L. BOWSER, Jr.